(12) United States Patent
Bhattacharyya et al.

(10) Patent No.: US 8,406,989 B1
(45) Date of Patent: Mar. 26, 2013

(54) METHOD FOR ADAPTIVE OBSTACLE AVOIDANCE FOR ARTICULATED REDUNDANT ROBOT ARM

(75) Inventors: Rajan Bhattacharyya, Encino, CA (US); Narayan Srinivasa, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 666 days.

(21) Appl. No.: 12/378,393

(22) Filed: Feb. 13, 2009

(51) Int. Cl.
*G06F 19/00* (2006.01)
*G06T 15/00* (2006.01)

(52) U.S. Cl. ........ 701/301; 345/474; 700/255; 700/262; 700/263; 703/2; 901/2

(58) Field of Classification Search .................. 701/300, 701/301; 345/474, 473, 475; 700/245, 251, 700/263, 262, 246, 252, 255; 427/137; 118/697; 703/2; 901/1, 2
See application file for complete search history.

(56) References Cited

U.S. PATENT DOCUMENTS

| | | | | |
|---|---|---|---|---|
| 4,999,553 | A * | 3/1991 | Seraji | 700/245 |
| 5,430,643 | A * | 7/1995 | Seraji | 700/263 |
| 5,737,500 | A * | 4/1998 | Seraji et al. | 700/251 |
| 2007/0255454 | A1 * | 11/2007 | Dariush | 700/245 |

OTHER PUBLICATIONS

D. Bullock, et al., "A self-organizing neural model of motor equivalent reaching and tool use by a multi-joint arm," Journal of Cognitive Neuroscience, vol. 5, pp. 408-435, 1993.
N. Srinivasa, et al., "A self-organizing neural model for fault tolerant control of redundant robots," in Proc. of the IEEE International Joint Conference on Neural Networks, pp. 1146-1152, 2007.
I. Iossifidis, et al., "Dynamical systems approach for the autonomous avoidance of obstacles and joint-limits for an redundant robot arm," Proc. of IEEE 2006 International Conference on Intelligent Robots and Systems, IROS'06, Beijing, China, Oct. 2006.
B.R. Fajen, et al., "A dynamical model of visually-guided steering, obstacle avoidance, and route selection," International Journal of Computer Vision, pp. 13-34, 2003.

* cited by examiner

*Primary Examiner* — Ronnie Mancho
(74) *Attorney, Agent, or Firm* — Tope-McKay & Associates

(57) ABSTRACT

A method for adaptive obstacle avoidance for articulated redundant robots is disclosed. The method comprises acts of calculating an obstacle avoidance vector for each of a set of limbs in a robot arm, and then applying the obstacle avoidance vector to constrain the inverse model in a robot controller. The obstacle avoidance vector incorporates factors including: (1) a distance and direction of each of a set of obstacles to the limb; and (2) when the limb is part of a kinematic chain of limbs, contributions from the obstacle avoidance vectors of all peripheral limbs in the kinematic chain. The method of the present invention was designed for use with the DIRECT model robot controller, but the method is generally applicable to any of a variety of robot controllers known in the art.

20 Claims, 6 Drawing Sheets

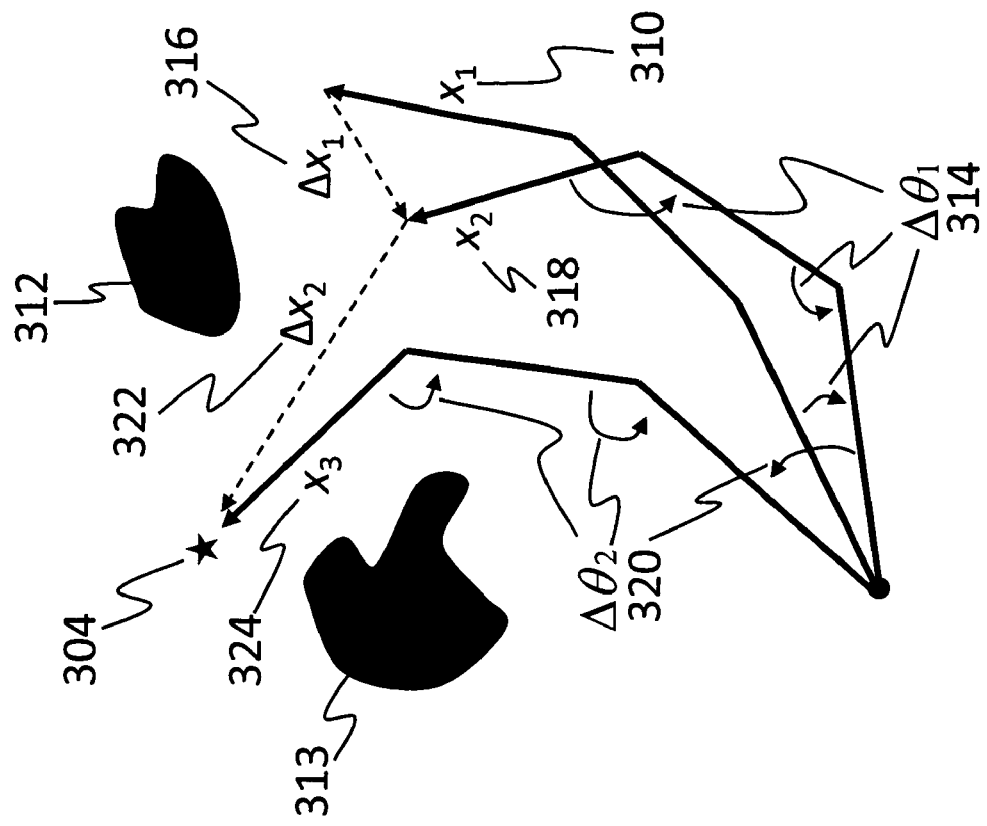
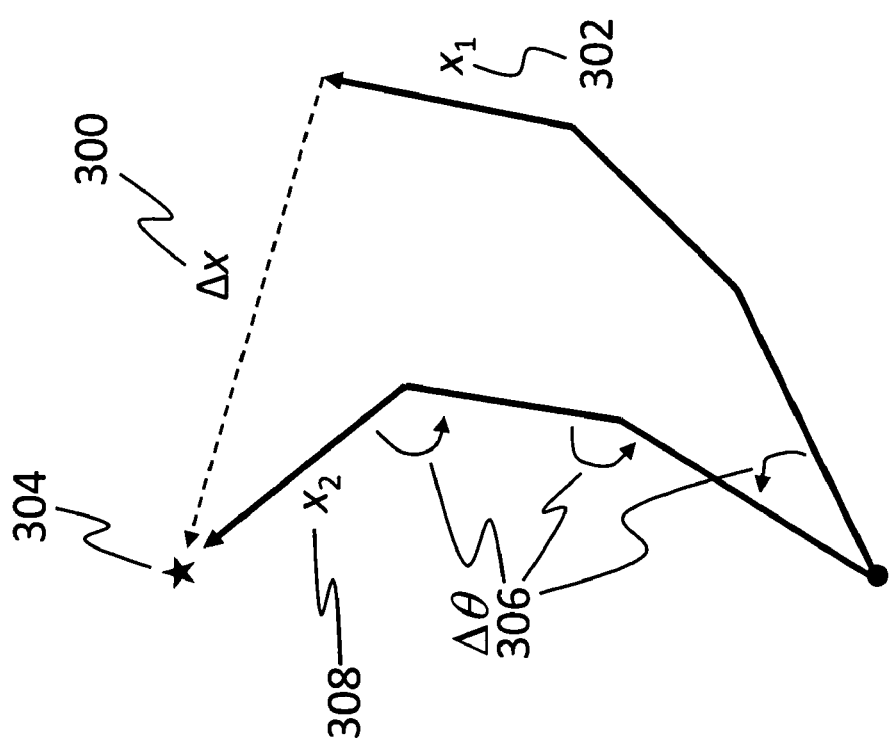
FIG. 3B
FIG. 3A

METHOD FOR ADAPTIVE OBSTACLE AVOIDANCE FOR ARTICULATED REDUNDANT ROBOT ARM

BACKGROUND OF THE INVENTION (1) Field of Invention

The present invention relates to robot controllers and, more particularly, to method for adaptive obstacle avoidance for articulated redundant robot arms.

(2) Description of Related Art

A variety of methods for controlling robot arms are known in the art [see references 1, 2, 3, and 4, cited below]. The most notable of such methods is the "Direction-to-Rotation Transform" (DIRECT) robot controller model disclosed in [1 and 2]. The DIRECT model develops relationships between joint angles and arm end locations by a random movement learning process known as "babbling." Babbling is similar to the strategy used by infants when learning to control their limbs. It involves making a series of random muscle motions and observing the resulting change in arm location. Over time, enough muscle-motion to arm-location relationships are learned that the infant can reach any desired location in the physical vicinity by retrieving the proper joint change from muscle memory. In the case of a robot controller, the system maps changes in joint angles to changes in end-effector locations during the babbling period. After building an extensive knowledge database of joint angle to end-effector location relationships, the system can reach any location in the physical vicinity by retrieving the proper joint angle changes necessary to reach that location. The DIRECT model is fault tolerant and scalable to large degrees of freedom. However, the DIRECT model lacks the ability to avoid obstacles while reaching for targets. This makes the DIRECT model impractical for use in environments containing obstacles.

Another method known in the art for controlling robot arms relies on known trajectories comprising readily available geometries and absolute joint angles [3]. The trajectory to the target serves as the attractor. The influence of each obstacle in the environment is superimposed on the attractor dynamics to modify the path to the target. The reliance of this system on prescribed trajectories makes it highly dependent on system parameters and difficult to implement. Also, the use of absolute joint angles results in poor fault tolerance and poor scalability to robots with large redundancy and perturbations.

Thus, a continuing need exists for a method of obstacle avoidance for robot arms that is fault-tolerant, scalable, and easily implemented in environments containing obstacles.

(3) References Cited

[1] D. Bullock, S. Grossberg, and F. H. Guenther, "A Self-Organizing Neural Model of Motor Equivalent Reaching and Tool Use by a Multi joint Arm," *Journal of Cognitive Neuroscience*, vol. 5, pp. 408-435, 1993.

[2] N. Srinivasa and S. Grossberg, "A Self-Organizing Neural Model for Fault Tolerant Control of Redundant Robots," in *Proc. of the IEEE International Joint Conference on Neural Networks*, pp. 1146-1152, 2007.

[3] Iossifidis, I and G. Schoner, "Dynamical Systems Approach for the Autonomous Avoidance of Obstacles and Joint-Limits for an Redundant Robot Arm," *Proc. of IEEE 2006 International Conference on Intelligent Robots and Systems*, IROS'06, Beijing, China, October 2006.

[4] B. R. Fajen, W. H. Warren, S. Temizer and L. P. Kaelbling, "A Dynamical Model of Visually-guided Steering, Obstacle Avoidance, and Route Selection," *International Journal of Computer Vision*, pp. 13-34, 2003.

SUMMARY OF INVENTION

The present invention relates to robot controllers and, more particularly, to method for adaptive obstacle avoidance for articulated redundant robot arms. The method begins with calculating an obstacle avoidance vector for each of a set of limbs in a robot arm. The obstacle avoidance vector incorporates factors including; (1) a distance and direction of each of a set of obstacles to the limb; and (2) when the limb is part of a kinematic chain of limbs, contributions from the obstacle avoidance vectors of all peripheral limbs in the kinematic chain. Then, the obstacle avoidance vector is applied to constrain the inverse model in a robot arm controller, whereby the robot arm can reach a target while avoiding obstacles.

In another aspect, the obstacle avoidance vector for each limb is determined by the equation:

$$\vec{v}_{limb\ n\ obstacle\ avoidance} = f(\vec{v}_{obstacles\ to\ limb\ n}, \vec{v}_{obstacle\ to\ limb\ n+1}, \ldots \vec{v}_{obstacles\ to\ limb\ m}) = \sum_{i=n}^{m} \vec{v}_{obstacles\ to\ limb\ i},$$

where:

$\vec{v}_{limb\ n\ obstacle\ avoidance}$ is the obstacle avoidance vector for limb n;

f(x) is the kinematic chaining function;

$\vec{v}_{obstacles\ to\ limb\ n}$ is a vector representing the distance and direction of all obstacles relative to limb n; and $$\sum_{i=n}^{m} \vec{v}_{obstacles\ to\ limb\ i}$$

is a summation function over all limbs in the kinematic chain.

In yet another aspect, the vector $\vec{v}_{obstacles\ to\ limb\ n}$, representing the distance and direction of all obstacles to limb n is determined by the equation:

$$\vec{v}_{obstacles\ to\ limb\ n} = \left(\frac{k}{\min\|\vec{v}_{obstacles\ to\ limb\ n}\|}\right) \times \left\|\frac{\sum_{i}^{\#obstacles}\left(\frac{1}{\|\vec{v}_{obstacle\ i\ to\ limb\ n}\|}\right)\vec{v}_{obstacle\ i\ to\ limb\ n}}{\left\|\sum_{i}^{\#obstacles}\left(\frac{1}{\|\vec{v}_{obstacle\ i\ to\ limb\ n}\|}\right)\vec{v}_{obstacle\ i\ to\ limb\ n}\right\|}\right\|,$$

where:

$\vec{v}_{obstacles\ to\ limb\ n}$ is a vector representing the distance and direction of all obstacles to limb n;

k is an operator-defined parameter for controlling the degree of obstacle avoidance desired;

min is a minimum function;

$\vec{v}_{obstacle\ i\ to\ limb\ n}$ is a vector representing the distance and direction of obstacle i to limb n;

$$\sum_{i}^{\#obstacles}$$

is a summation function over all obstacles;

‖x‖ is the magnitude of x; and $\min\|\vec{v}_{obstacles\ to\ limb\ n}\|$ is the minimum distance from all obstacles to limb n.

In a further aspect of the method of the present invention, the obstacle avoidance vector constrains the inverse model in a robot controller according to the equation:

$$\Delta\theta_n = \partial_n \times (\vec{v}_{target} - \vec{v}_{limb\ n\ obstacle\ avoidance}),$$

where:

$\Delta\theta_n$ is the change in joint angle for limb n;

$\partial_n$ is the nth row of the inverse Jacobian matrix learned during babbling;

× is a multiplication function;

$\vec{v}_{target}$ is a target vector representing the direction and distance from the limb to the target; and $\vec{v}_{limb\ n\ obstacle\ avoidance}$ is the obstacle avoidance vector for limb n.

Another aspect of the present invention is a data processing system for adaptive obstacle avoidance for articulated redundant robots comprising one or more processors configured to perform the acts of the method of the present invention, as previously described.

A further aspect of the present invention is a computer program product for adaptive obstacle avoidance for articulated redundant robots. The computer program product comprises computer-readable instructions stored on a computer-readable medium that are executable by a computer having a processor for causing the processor to perform the acts of the method of the present invention, as previously described.

BRIEF DESCRIPTION OF THE DRAWINGS

The objects, features and advantages of the present invention will be apparent from the following detailed descriptions of the various aspects of the invention in conjunction with reference to the following drawings, where:

FIG. 3A is a diagram showing a robot arm reaching for a target as executed by the DIRECT method controller;

FIG. 3B is a diagram showing a robot arm reaching for a target using a series of motions as executed by the method of the present invention as applied to a DIRECT method controller;

DETAILED DESCRIPTION

Figure 1:
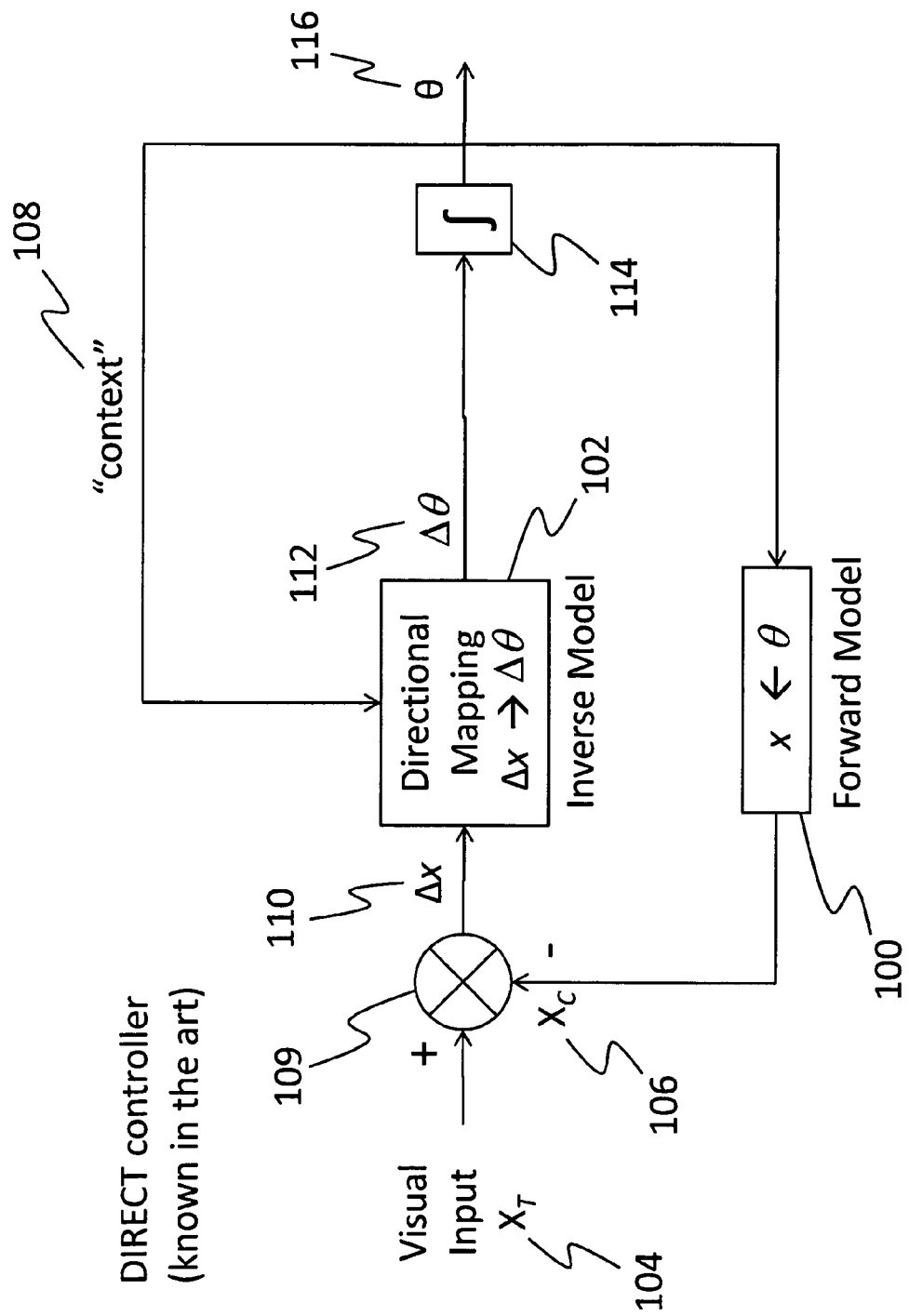
FIG. 1 is a flow diagram showing a robot controller according to the DIRECT method, as known in the art.

The present invention relates to robot controllers and, more particularly, to method for adaptive obstacle avoidance for articulated redundant robot arms. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Further, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Introduction

Reaching for targets in space is a basic activity performed by humans and animals. The ability to reach for targets is acquired via learning in the early stages of life and is repeatedly refined as an organism grows and the control plan of the organism changes. Learning offers the flexibility to adapt muscle controls as new situations are encountered. Industrial robots are far more programmed and less flexible than biological organisms in order provide repeatable safe and robust operations. Because of this, movement through a complex obstacle environment must be programmed into the robot controller, making it ill-suited to changing real-world situations.

The purpose of the present invention is to provide a robust robot arm controller that can adapt to real-world situations. The present invention allows a robot to negotiate around obstacles in various environments in an un-programmed fashion. The invention is inspired by the learning processes of biological organisms. It offers a learning framework to acquire reaching capability, and then to modify the controller via perceptual influences in order to avoid obstacles during reaching. The present invention obviates the need to precisely program paths for robots to follow as with current industrial robots, offering a degree of autonomy not known in the art.

(2) Method for Adaptive Obstacle Avoidance

The present invention relates to robot controllers [see references 1, 2, 3, and 4, cited above] and, more particularly, to a method for adaptive obstacle avoidance for articulated redundant robot arms. The method of the present invention was originally developed as an extension of the "Direction-to-Rotation Transform" (DIRECT) method robot controller [1 and 2]. However, it should be noted that the method of the present invention is applicable to robot controllers in general, and should not be interpreted as being limited to applications to the DIRECT method. Redundancy in this context means a robot arm contains at least one joint with at least as many degrees of freedom as the dimensions of task space. For example, for a two dimensional task space the robot arm needs, at a minimum, one joint with two degrees of freedom. If this joint is the shoulder then the two angles may be thought of as azimuth and elevation. For a three dimensional task space one joint with three degrees of freedom or two joints where the sum of degrees of freedom of the two joints greater than or equal to three. In general, the sum of the degrees of freedom of all the joints of a robot arm must be greater than or equal to the dimensions of the task space.

FIG. 1A is a flow diagram showing a robot controller in accordance with the DIRECT method, as known in the art and described in [1 and 2]. The DIRECT method depends on construction of two different models, a forward model 100, and an inverse model 102. The forward model 100 maps joint angles to corresponding arm locations. The inverse model 102 maps changes in arm locations to changes in joint angles. The forward and inverse models are developed during a "babbling" learning phase in which the robot makes a series of small random movements and observes the resulting change in arm position corresponding to each movement. As babbling continues, the learning process gradually refines the forward and inverse models. The equations describing the learning process are outlined in [1 and 2]. The learning phase is generally performed in obstacle-free space. The DIRECT controller receives visual input 104 regarding the location of a target ($X_T$) in space. The controller obtains the current position of the arm end-effector ($X_C$) 106 from the current joint angles or "context" 108, using the forward model 100. The system then calculates 109 the necessary change in end-effector location ($\Delta x$) 110 required to reach the target. The inverse model 102 provides the changes in joint angles ($\Delta\theta$) 112 necessary to achieve the required change in end-effector location 110. The calculated joint angle change 112 is then integrated 114 with the current joint angles to produce the new posture ($\theta$) 116 of the arm. The new posture provides the "context" 108 for the next movement. This process can be repeated until the target is reached, or until some other termination criterion is fulfilled.

Figure 2:
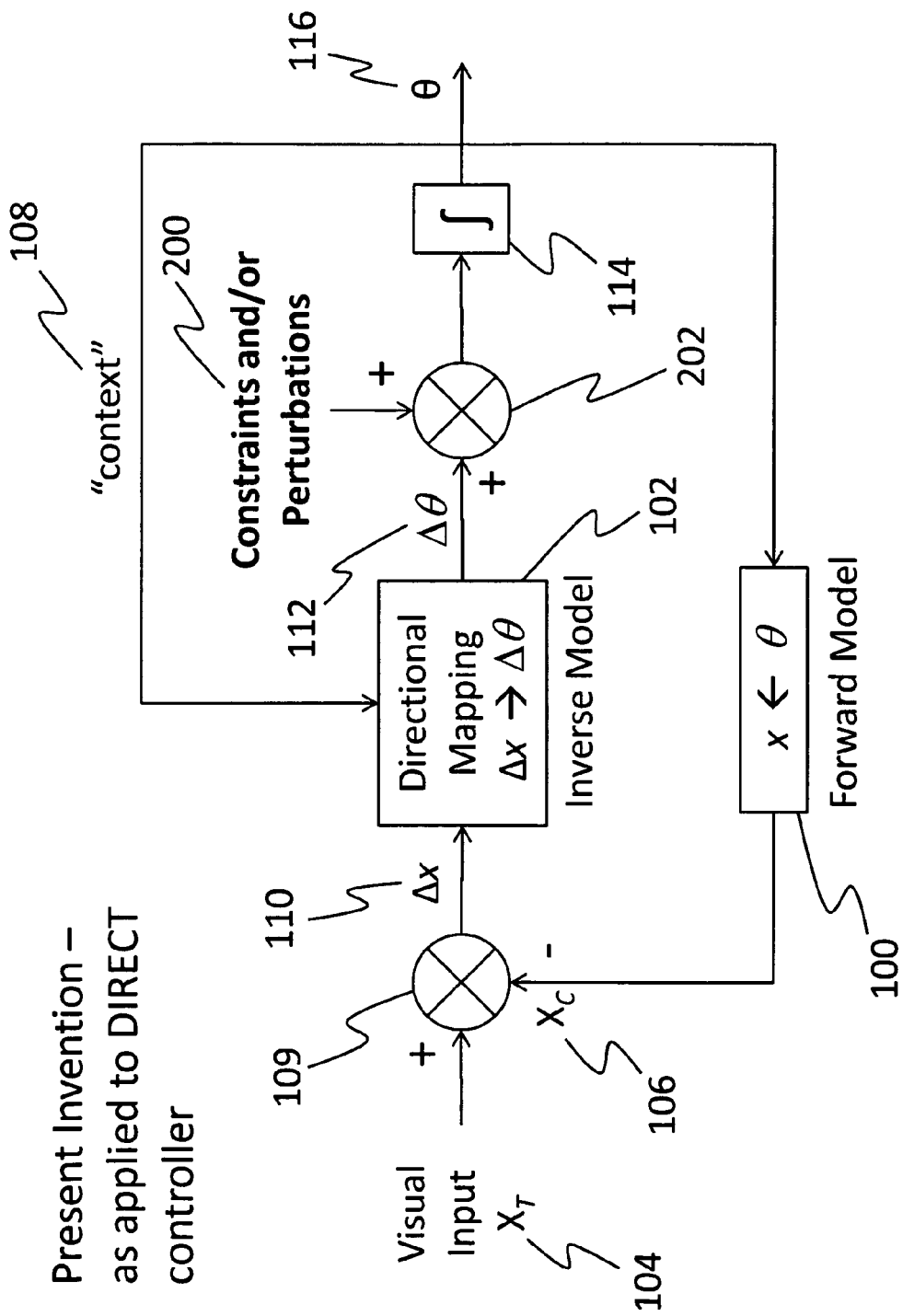
FIG. 2 is a flow diagram showing the present invention as applied to the DIRECT method controller.

FIG. 2 is a flow diagram showing the present invention as applied to a DIRECT robot controller. The present invention introduces object constraints 200 which can represent a variety of factors. In particular, the method of the present invention addresses constraints derived from obstacles in the operating environment. The system calculates constraints 200 based on perceived obstacles in the environment, and combines 202 those constraints with the changes in joint angles 112 derived from the inverse model 102. The resulting joint angle changes are then integrated 114 to produce a new arm posture 116. This process can be repeated until the target is reached, or until some other termination criterion is fulfilled.

FIG. 3A is a diagram showing a robot arm reaching for a target as executed by the DIRECT method controller, as previously described. The controller determines a desired change in end-effector location ($\Delta x$) 300 based on the current arm position ($x_1$) 302 and the position of the target 304. The controller then determines the joint angle changes ($\Delta\theta$) 306 required to accomplish the required end-effector location change 300. The movement is executed, resulting in a new arm position ($x_2$) 308. It should be noted that in the example shown in FIG. 3A, the target 304 was reached in one movement, but the same result could be accomplished using multiple small movements.

FIG. 3B is a diagram showing a robot arm reaching for a target using a series of motions as executed by the method of the present invention as applied to the DIRECT method controller. In this case the path from the initial arm position ($x_1$) 310 to the target 304 is partially obstructed on both sides by obstacles 312 and 313. The present invention applies constraints to the controller based on obstacles in the work space. These constraints cause the controller to calculate a path for the arm which approaches the target 304 while steering away from obstacles 312 and 313. In this case, an obstacle 312 lies between the initial end-effector location ($x_1$) and the target 304. The controller will calculate a desired joint angle change similar to the path $\Delta x$ 300 calculated in FIG. 3A, and then determine the joint angle changes ($\Delta\theta$) 306 required to accomplish the required end-effector location change 300 (as in FIG. 3A). However, in FIG. 3B the calculated joint angle change will be altered by constraints imposed by the obstacles 312 and 313 in the workspace, resulting in a modified joint angle change ($\Delta\theta_1$) 314. Correspondingly, the end-effector location has changed by distance $\Delta x_1$ 316, moving it both closer to the target 304 and away from the nearest obstacle 312. The arm is now in position $x_2$ 318. From position $x_2$ 318, the controller again calculates a desired change in end-effector location ($\Delta x$) 300 and a corresponding change in joint angles ($\Delta\theta$) 306 as if unobstructed by obstacles (as in FIG. 3A). Then, the controller adds constraints imposed by the obstacles 312 and 313 in the work space (in FIG. 3B), resulting in a modified joint angle change ($\Delta\theta_2$) 320. Correspondingly, the end-effector location is changed by a distance $\Delta x_2$ 322, resulting in arm position $x_3$ 324, which reaches the target 304. Since the path for the second movement ($\Delta x_2$) 322 was substantially unobstructed, the constraints imposed on $\Delta\theta$ in the controller by the obstacles were most likely negligible, allowing for a direct movement to the target 304. It should be noted that the present invention provides a method for adaptive obstacle avoidance for robot controllers that were trained in obstacle-free space. This type of system is highly adaptable to any new obstacle environment because the controller does not need to be re-trained every time the obstacle landscape changes.

Figure 4:
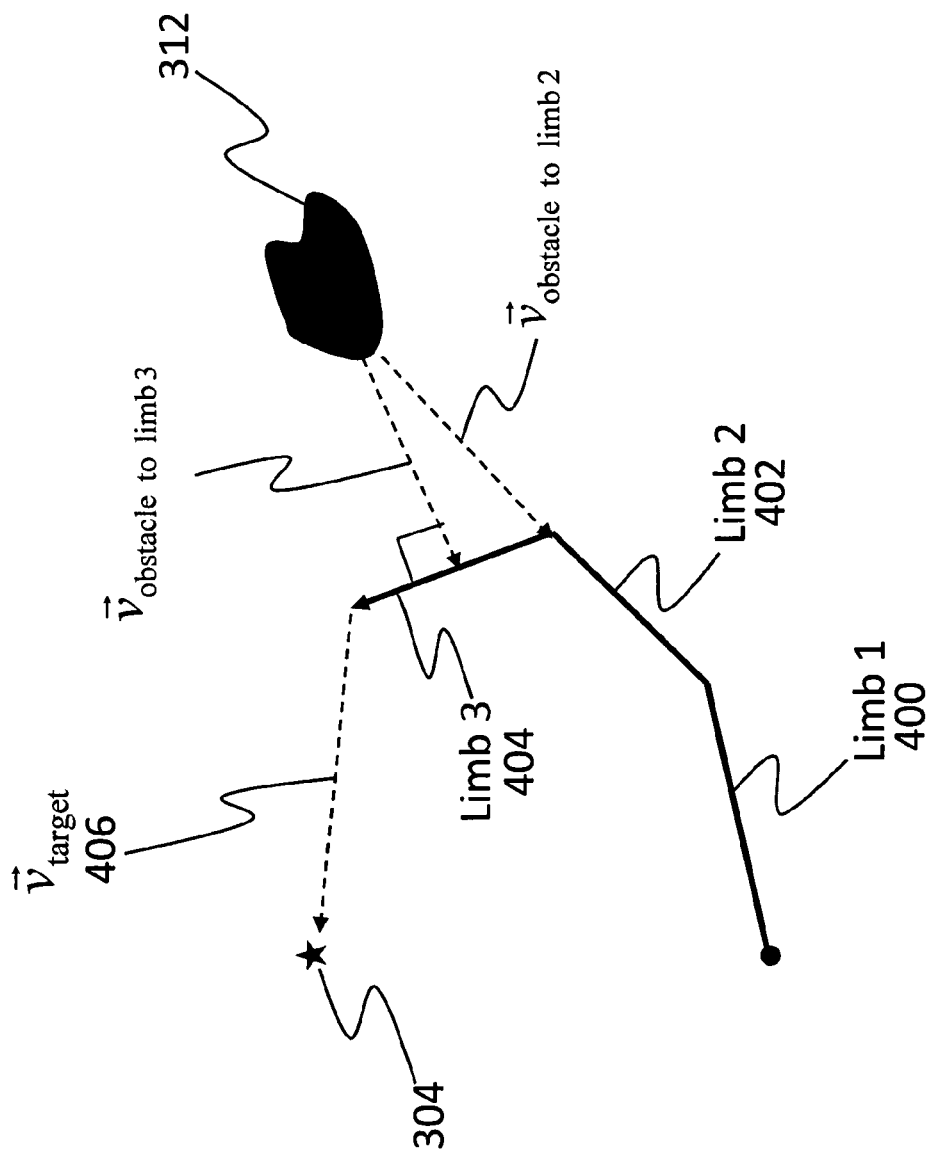
FIG. 4 is a diagram showing the vector notation used in the present invention, as applied to a three degree-of-freedom (3-DOF) planar robot in a two-dimensional (2-D) workspace.

FIG. 4 is a diagram showing the vector notation used in the present invention, as applied to a three degree-of-freedom (3-DOF) planar robot in a two-dimensional (2-D) workspace. A 3-DOF robot and 2-D workspace were chosen for ease of illustration, however, the method of the present invention readily applies to any number of degrees of freedom and to any number of dimensions in the workspace. The 3-DOF robot shown has three limbs, labeled limb 1 400, limb 2 402, and limb 3 404. The workspace surrounding the robot contains a target 304 and an obstacle 312. The vector $\vec{v}_{target}$ 406 extends from the end-effector of the robot arm (i.e. the endpoint of limb 3 404) to the target 304, where $\vec{v}_{target}$ 406 is a two dimensional vector that can be broken down into x and y components as follows:

$$\vec{v}_{target} = [x_{target}, y_{target}].$$

FIG. 4 further illustrates a pair of vectors, $\vec{v}_{obstacle\ to\ limb\ 2}$ 408 and $\vec{v}_{obstacle\ to\ limb\ 3}$ 410, which extend from the obstacle to the nearest point on limb 2 402 and limb 3 404, respectively. These vectors represent the optimal direction for a limb to travel in order to avoid the obstacle, i.e., moving directly away from the obstacle. In the case of limb 2 402, the obstacle 312 is located beyond the radius of the limb 402, and thus the vector $\vec{v}_{obstacle\ to\ limb\ 2}$ 408 represents the shortest distance between the obstacle 312 and the endpoint of limb 2 402. In the case of limb 3 404, the vector $\vec{v}_{obstacle\ to\ limb\ 3}$ 410, representing the shortest distance to from the obstacle 312 to the limb 404, is a normal vector. The vector $\vec{v}_{obstacle\ to\ limb\ n}$ will be a normal vector in all cases where the obstacle 312 lies within the swing radius of the arm, as with limb 3 404. The vector $\vec{v}_{obstacle\ to\ limb\ n}$ can also be broken down into x and y components, as follows:

$$\vec{v}_{obstacle\ to\ limb\ n} = [x_{obstacle\ to\ limb\ n}, y_{obstacle\ to\ limb\ n}].$$

The DIRECT controller updates joint angles by applying a transformation on the desired change in end-effector location. This transformation is preferably the inverse of the Jacobian matrix learned during the babbling phase, which has elements for each dimension in the workspace and each joint in the arm, as shown below:

$$J^{-1}(\theta) = \begin{bmatrix} \partial_{11} & \cdots & \partial_{1d} \\ \vdots & \ddots & \vdots \\ \partial_{n1} & \cdots & \partial_{nd} \\ \vdots & \ddots & \vdots \\ \partial_{m1} & \cdots & \partial_{md} \end{bmatrix},$$

where:
$J^{-1}(\theta)$ represents the inverse of the Jacobian matrix for the joint angle $\theta$;
n is a limb;
m is the total number of limbs in the kinematic chain;
d is the number of dimensions in Cartesian space; and
$\partial_{nd}$ is the joint angle for a joint n in the Cartesian dimension d.

The elements of the Jacobian matrix are learned during the "babbling" phase in obstacle-free space as described in [1 and 2]. The Jacobian represents the mapping from a given change in joint angles to the achieved direction of the end of the robot arm. The inverse model represents the mapping between a desired direction of end position in the end of the robot arm and the change in angles of each degree of freedom of each joint. The present invention constrains the inverse model in the controller by subtracting an obstacle avoidance vector ($\vec{v}_{limb\ n\ obstacle\ avoidance}$) from the desired change in arm endpoint according to the following equation:

$$\Delta\theta_n = \partial_n \times (\vec{v}_{target} - \vec{v}_{limb\ n\ obstacle\ avoidance}),$$

where:
$\Delta\theta_n$ is the change in joint angle for limb n;
$\partial_n$ is the nth row of the inverse Jacobian matrix learned during babbling;
× is a multiplication function;
$\vec{v}_{target}$ is a target vector representing the direction and distance from the limb to the target; and
$\vec{v}_{limb\ n\ obstacle\ avoidance}$ is the obstacle avoidance vector for limb n.

The obstacle avoidance constraints are applied to each limb independently. The obstacle avoidance vector $\vec{v}_{limb\ n\ obstacle\ avoidance}$ can comprise any of a variety of factors, but should at a minimum depend on: (1) the distance and direction of each obstacle in the workspace to each limb, denoted as $\vec{v}_{obstacle\ to\ limb\ n}$ and illustrated in FIGS. 4; and (2) when the limb is part of a kinematic chain of limbs, contributions from the obstacle avoidance vectors of all peripheral limbs in the kinematic chain.

A specific function which can be used to determine $v_{limb\ n\ obstacle\ avoidance}$ is shown below:

$$\vec{v}_{limb\ n\ obstacle\ avoidance} = $$
$$f(\vec{v}_{obstacles\ to\ limb\ n}, \vec{v}_{obstacle\ to\ limb\ n+1}, \ldots \vec{v}_{obstacles\ to\ limb\ m}) = $$
$$\sum_{i=n}^{m} \vec{v}_{obstacles\ to\ limb\ i}$$

where:
$\vec{v}_{limb\ n\ obstacle\ avoidance}$ is the obstacle avoidance vector for limb n;
f(x) is a kinematic chaining function;
$\vec{v}_{obstacles\ to\ limb\ n}$ is a vector representing the distance and direction of all obstacles relative to limb n; and $$\sum_{i=n}^{m} \vec{v}_{obstacles\ to\ limb\ i}$$

is a summation function over all limbs in the kinematic chain; and where:

$$\vec{v}_{obstacles\ to\ limb\ n} = \left( \frac{k}{\min \|\vec{v}_{obstacles\ to\ limb\ n}\|} \right) \times$$
$$\left( \frac{\sum_{i}^{\#obstacles} \left( \frac{1}{\|\vec{v}_{obstacle\ i\ to\ limb\ n}\|} \right) \vec{v}_{obstacle\ i\ to\ limb\ n}}{\left\| \sum_{i}^{\#obstacles} \left( \frac{1}{\|\vec{v}_{obstacle\ i\ to\ limb\ n}\|} \right) \vec{v}_{obstacle\ i\ to\ limb\ n} \right\|} \right),$$

where:
$\vec{v}_{obstacles\ to\ limb\ n}$ is a vector representing the distance and direction of all obstacles to limb n;
k is an operator-defined parameter for controlling the degree of obstacle avoidance desired;
min is a minimum function;
$\vec{v}_{obstacle\ i\ to\ limb\ n}$ is a vector representing the distance and direction of obstacle i to limb n;

$$\sum_{i}^{\#obstacles}$$

is a summation function over all obstacles;
$\|x\|$ is the magnitude of x; and
$\min\|\vec{v}_{obstacles\ to\ limb\ n}\|$ is the minimum distance from all obstacles to limb n.

Also, as an example for a single joint angle $\theta_3$ trained in a two-dimensional Cartesian space:

$$\Delta\theta_3 = \partial_{3x} \times \left( x_{target} + \left( \frac{k}{\min\|\vec{v}_{obstacles\ to\ limb\ 3}\|} \right) \right.$$

$$\left. \left[ \frac{\sum_i^{\#obstacles} \left( \frac{1}{\|\vec{v}_{obstacle\ i\ to\ limb\ 3}\|} \right) x_{obstacle\ i\ to\ limb\ 3}}{\left\| \sum_i^{\#obstacles} \left( \frac{1}{\|\vec{v}_{obstacle\ i\ to\ limb\ 3}\|} \right) x_{obstacle\ i\ to\ limb\ 3} \right\|} \right] \right) +$$

$$\partial_{3y} \times \left( y_{target} + \left( \frac{k}{\min\|\vec{v}_{obstacles\ to\ limb\ 3}\|} \right) \right.$$

$$\left. \left[ \frac{\sum_i^{\#obstacles} \left( \frac{1}{\|\vec{v}_{obstacle\ i\ to\ limb\ 3}\|} \right) y_{obstacle\ i\ to\ limb\ 3}}{\left\| \sum_i^{\#obstacles} \left( \frac{1}{\|\vec{v}_{obstacle\ i\ to\ limb\ 3}\|} \right) y_{obstacle\ i\ to\ limb\ 3} \right\|} \right] \right),$$

where:
$\Delta\theta_3$ is the change in joint angle for limb 3;
$\partial_{3x}$ is the x component of the inverse Jacobian learned during babbling;
$x_{target}$ is the x component of the vector from limb 3 to the target;
$\partial_{3y}$ is the y component of the inverse Jacobian learned during babbling; and
$y_{target}$ is the y component of the vector from limb 3 to the target.

The obstacle avoidance vector $\vec{v}_{limb\ n\ obstacle\ avoidance}$ includes contributions from all obstacles. It also depends on the position of the limb n in the total kinematic chain of m limbs. The term "kinematic chain," as known in the art and used in this document, means linked by motion. For example, a shoulder movement affects a kinematic chain comprising the upper arm, the forearm, and the hand. An elbow movement affects a kinematic chain comprising the forearm and hand. A wrist movement only affects the motion of the hand. The same basic principle applies to a redundant robot arm with multiple limbs, where the movement of basal limbs will affect the movement of peripheral limbs.

A host of functions can be used to weight the vectors, such as an inverse distance function and an exponential function. In a preferred embodiment the inverse distance function $$\frac{1}{\|\vec{v}_{obstacle\ to\ limb\ n}\|}$$

is used to weight the vectors. Thus, the vector $\vec{v}_{obstacles\ to\ limb\ n}$ is scaled by the magnitude of the distance of each obstacle to the limb n.

Overall, $\vec{v}_{limb\ n\ obstacle\ avoidance}$ is a unit direction vector that represents the weighted average of the vectors for all obstacles, represented by the factor $$\left( \frac{\sum_i^{\#obstacles} \left( \frac{1}{\|\vec{v}_{obstacle\ i\ to\ limb\ n}\|} \right) \vec{v}_{obstacle\ i\ to\ limb\ n}}{\left\| \sum_i^{\#obstacles} \left( \frac{1}{\|\vec{v}_{obstacle\ i\ to\ limb\ n}\|} \right) \vec{v}_{obstacle\ i\ to\ limb\ n} \right\|} \right)$$

in the above equations. Since more weight is given to vectors with closer proximity between obstacle and limb, the direction of $\vec{v}_{limb\ n\ obstacle\ avoidance}$ represents the optimal direction for a limb n to move in order to simultaneously avoid all obstacles.

The unit direction vector $\vec{v}_{limb\ n\ obstacle\ avoidance}$ is scaled by the weighting factor $$\left( \frac{k}{\min\|\vec{v}_{obstacles\ to\ limb\ n}\|} \right),$$

which weights the vector by the inverse of the minimum distance from limb n to all obstacles, and multiplies this by a parameter k (described below). This final weighting by the minimum distance constrains the change in joint angle based on the closest, and most urgent, obstacle.

Finally, the parameter k is an operator-determined parameter which controls the degree of obstacle avoidance. A breakdown of the components of parameter k is shown below:

$$k = k_0 \times \|\vec{v}_{target}\|,$$

where:
$k_0$ is an operator defined parameter; and
$\|\vec{v}_{target}\|$ is the distance to the target.

The distance to the target $\|\vec{v}_{target}\|$ is included in order to weight the obstacle avoidance vector as heavily as the target. Often, the target distance is much greater than one unit from the end-effector. Without the term $\|\vec{v}_{target}\|$, the contributions from the target would dominate the joint angle update, thereby creating obstacle avoidance only when the minimum distance to an obstacle is much less than one unit. The user defined parameter $k_0$ allows the amount of obstacle avoidance to be scaled, where $0 < k_0 < 1$. A value of $k_0 = 0$ cancels any avoidance, while $k_0 = 1$ causes total avoidance. An appropriate parameter $k_0$ should be chosen to suit the unique obstacle environment at hand.

(3) Data Processing System

Figure 5:
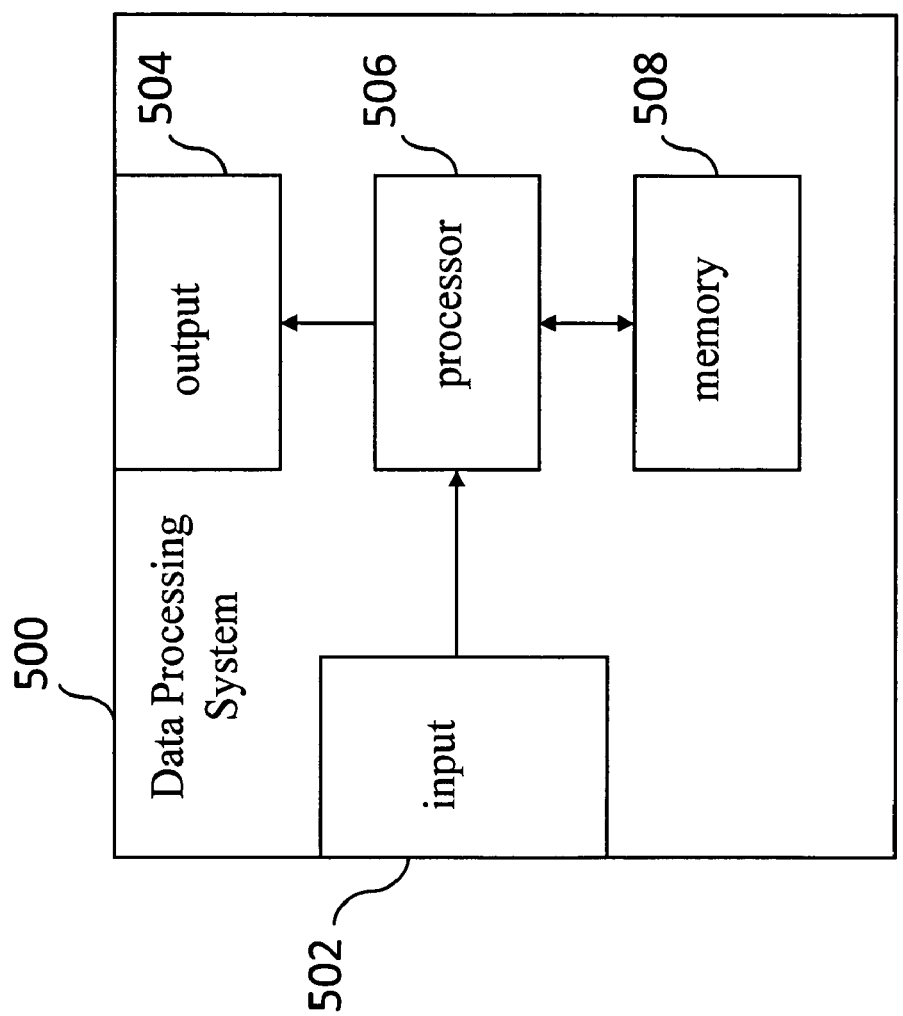
FIG. 5 is a block diagram showing a generic data processing system according to the present invention.

A block diagram depicting the components of a generic obstacle avoidance data processing system for the present invention is provided in FIG. 5. The data processing system 500 comprises an input 502 for receiving information from at least one input data source or from an operator. Note that the input 502 may include multiple "ports." Typically, input is received from at least one visual detector, from stored images of the workspace, or from a training set. The input may also comprise the locations of obstacles in the environment. An output 504 is connected with the processor for providing information regarding directions and distances of limbs to the target and to obstacles, and to output execution commands to the robot. Output may also be provided to other devices or other programs; e.g., to other software modules, for use therein. The input 502 and the output 504 are both coupled with one or more processors 506, the processor containing appropriate architecture to perform the acts of the method of the present invention, including, but not limited to calculating an obstacle avoidance vector for each of a set of limbs in a robot arm and applying the obstacle avoidance vectors to constrain the inverse model in a robot controller. The processor 506 is coupled with a memory 508 to permit storage of data such as object locations and software that are to be manipulated by commands to the processor 506.

(4) Computer Program Product

Figure 6:
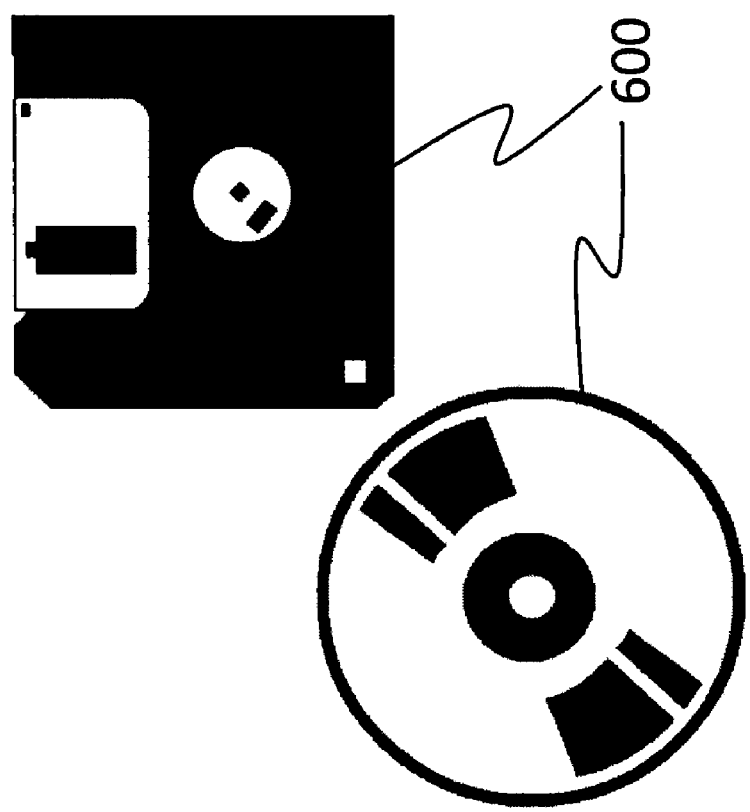
FIG. 6 is an illustration showing examples of computer program products for use with the present invention.

An illustrative diagram of a computer program product embodying the present invention is depicted in FIG. 6. The computer program product 600 is depicted as an optical disk such as a CD or DVD, but the computer program product generally represents any platform containing comprising computer-readable instruction means stored on a computer-readable medium that are executable by a computer having a processor for causing the processor to perform operations of the method of the present invention, as previously described.

What is claimed is:

1. A method for adaptive obstacle avoidance for an articulated redundant robot arm, comprising acts of:
 developing an inverse model for a robot arm during a babbling learning phase in which a robot arm controller causes a set of limbs in the robot arm to make a series of random movements and observes a change in position of the set of limbs corresponding to each of the random movements;
 calculating an obstacle avoidance vector for each of the set of limbs in the robot arm to form a plurality of obstacle avoidance vectors, each of the obstacle avoidance vectors incorporating factors including;
 a distance and direction of each of a set of obstacles to the limb; and when the limb is part of a kinematic chain of limbs, summing contributions from the obstacle avoidance vectors of all limbs in the kinematic chain; and
 applying the obstacle avoidance vector to constrain an inverse model in a robot arm controller, whereby the robot arm can reach a target while avoiding obstacles.

2. The method of claim 1, wherein the obstacle avoidance vector for each limb is determined by the equation:

$$\vec{v}_{limb\ n\ obstacle\ avoidance} =$$
$$f(\vec{v}_{obstacles\ to\ limb\ n}, \vec{v}_{obstacle\ to\ limb\ n+1}, \ldots \vec{v}_{obstacles\ to\ limb\ m}) =$$
$$\sum_{i=n}^{m} \vec{v}_{obstacles\ to\ limb\ i},$$

where:

$\vec{v}_{limb\ n\ obstacles\ avoidance}$ is the obstacle avoidance vector for limb n;

f(x) is the kinematic chaining function;

$\vec{v}_{obstacles\ to\ limb\ n}$ is a vector representing the distance and direction of all obstacles relative to limb n; and $$\sum_{i=n}^{m} \vec{v}_{obstacles\ to\ limb\ i}$$

is a summation function over all limbs in the kinematic chain.

3. The method of claim 2, wherein the vector $\vec{v}_{obstacles\ to\ limb\ n}$, representing the distance and direction of all obstacles to limb n is determined by the equation:

$$\vec{v}_{obstacles\ to\ limb\ n} = \left(\frac{k}{\min\|\vec{v}_{obstacles\ to\ limb\ n}\|}\right) \times \left(\frac{\sum_{i}^{\#obstacles}\left(\frac{1}{\|\vec{v}_{obstacle\ i\ to\ limb\ n}\|}\right)\vec{v}_{obstacle\ i\ to\ limb\ n}}{\left\|\sum_{i}^{\#obstacles}\left(\frac{1}{\|\vec{v}_{obstacle\ i\ to\ limb\ n}\|}\right)\vec{v}_{obstacle\ i\ to\ limb\ n}\right\|}\right),$$

where:

$\vec{v}_{obstacles\ to\ limb\ n}$ is a vector representing the distance and direction of all obstacles to limb n;

k is an operator-defined parameter for controlling the degree of obstacle avoidance desired;

min is a minimum function; $\vec{v}_{obstacle\ i\ to\ limb\ n}$ is a vector representing the distance and direction of obstacle i to limb n;

$$\sum_{i}^{\#obstacles}$$

is a summation function over all obstacles;

∥x∥ is the magnitude of x; and $\min\|\vec{v}_{obstacles\ to\ limb\ n}\|$ is the minimum distance from all obstacles to limb n.

4. The method of claim 3, wherein the obstacle avoidance vector constrains the inverse model in a robot controller according to the equation:

$$\Delta\theta_n = \partial_n \times (\vec{v}_{target} - \vec{v}_{limb\ n\ obstacle\ avoidance}),$$

where:

$\Delta\theta_n$ is the change in joint angle for limb n;

$\partial_n$ is the nth row of the inverse Jacobian matrix learned during babbling;

× is a multiplication function;

$\vec{v}_{target}$ is a target vector representing the direction and distance from the limb to the target; and $\vec{v}_{limb\ n\ obstacle\ avoidance}$ is the obstacle avoidance vector for limb n.

5. The method of claim 1, wherein the obstacle avoidance vector constrains the inverse model in a robot controller according to the equation:

$$\Delta\theta_n = \partial_n \times (\vec{v}_{target} - \vec{v}_{limb\ n\ obstacle\ avoidance}),$$

where:

$\Delta\theta_n$ is the change in joint angle for limb n;

$\partial_n$ is the nth row of the inverse Jacobian matrix learned during babbling;

× is a multiplication function;

$\vec{v}_{target}$ is a target vector representing the direction and distance from the limb to the target; and $\vec{v}_{limb\ n\ obstacle\ avoidance}$ is the obstacle avoidance vector for limb n.

6. A data processing system for adaptive obstacle avoidance for an articulated redundant robot arm, comprising one or more processors configured to:

develop an inverse model for a robot arm during a babbling learning phase in which a robot arm controller causes a set of limbs in the robot arm to make a series of random movements and observes a change in position of the set of limbs corresponding to each of the random movements;

calculate an obstacle avoidance vector for each of the set of limbs in the robot arm to form a plurality of obstacle avoidance vectors, each of the obstacle avoidance vectors incorporating factors including;
- a distance and direction of each of a set of obstacles to the limb; and
- when the limb is part of a kinematic chain of limbs, summing contributions from the obstacle avoidance vectors of all limbs in the kinematic chain; and apply the obstacle avoidance vector to constrain the inverse model in a robot controller, whereby the robot arm can reach a target while avoiding obstacles.

7. The date processing system of claim 6, wherein the obstacle avoidance vector for each limb is determined by the equation:

$$\vec{v}_{limb\ n\ obstacle\ avoidance} = f(\vec{v}_{obstacles\ to\ limb\ n}, \vec{v}_{obstacles\ to\ limb\ n+1}, \ldots \vec{v}_{obstacles\ to\ limb\ m}) = \sum_{i=n}^{m} \vec{v}_{obstacles\ to\ limb\ i},$$

where:

$\vec{v}_{limb\ n\ obstacle\ avoidance}$ is the obstacle avoidance vector for limb n;

f(x) is the kinematic chaining function;

$\vec{v}_{obstacles\ to\ limb\ n}$ is a vector representing the distance and direction of all obstacles relative to limb n; and $$\sum_{i=n}^{m} \vec{v}_{obstacles\ to\ limb\ i}$$

is a summation function over all limbs in the kinematic chain.

8. The data processing system of claim 7, wherein the vector $\vec{v}_{obstacles\ to\ limb\ n}$, representing the distance and direction of all obstacles to limb n is determined by the equation:

$$\vec{v}_{obstacles\ to\ limb\ n} = \left(\frac{k}{\min\|\vec{v}_{obstacles\ to\ limb\ n}\|}\right) \times \left(\frac{\sum_{i}^{\#obstacles}\left(\frac{1}{\|\vec{v}_{obstacle\ i\ to\ limb\ n}\|}\right)\vec{v}_{obstacle\ i\ to\ limb\ n}}{\left\|\sum_{i}^{\#obstacles}\left(\frac{1}{\|\vec{v}_{obstacle\ i\ to\ limb\ n}\|}\right)\vec{v}_{obstacle\ i\ to\ limb\ n}\right\|}\right),$$

where:

$\vec{v}_{obstacles\ to\ limb\ n}$ is a vector representing the distance and direction of all obstacles to limb n;

k is an operator-defined parameter for controlling the degree of obstacle avoidance desired;

min is a minimum function;

$\vec{v}_{obstacle\ i\ to\ limb\ n}$ is a vector representing the distance and direction of obstacle i to limb n;

$$\sum_{i}^{\#obstacles}$$

is a summation function over all obstacles;

$\|x\|$ is the magnitude of x; and $\min\|\vec{v}_{obstacles\ to\ limb\ n}\|$ is the minimum distance from all obstacles to limb n.

9. The data processing system of claim 8, wherein the obstacle avoidance vector constrains the inverse model in a robot controller according to the equation:

$$\Delta\theta_n = \partial_n \times (\vec{v}_{target} - \vec{v}_{limb\ n\ obstacle\ avoidance}),$$

where:

$\Delta\theta_n$ is the change in joint angle for limb n;

$\partial_n$ is the nth row of the inverse Jacobian matrix learned during babbling;

× is a multiplication function;

$\vec{v}_{target}$ is a target vector representing the direction and distance from the limb to the target; and $\vec{v}_{limb\ n\ obstacle\ avoidance}$ is the obstacle avoidance vector for limb n.

10. The data processing system of claim 6, wherein the obstacle avoidance vector constrains the inverse model in a robot controller according to the equation:

$$\Delta\theta_n = \partial_n \times (\vec{v}_{target} - \vec{v}_{limb\ n\ obstacle\ avoidance}),$$

where:

$\Delta\theta_n$ is the change in joint angle for limb n;

$\partial_n$ is the nth row of the inverse Jacobian matrix learned during babbling;

× is a multiplication function;

$\vec{v}_{target}$ is a target vector representing the direction and distance from the limb to the target; and $\vec{v}_{limb\ n\ obstacle\ avoidance}$ is the obstacle avoidance vector for limb n.

11. A computer program product for adaptive obstacle avoidance for an articulated redundant robot arm, the computer program product comprising computer-readable instructions stored on a computer-readable medium that are executable by a computer having a processor for causing the processor to:

develop an inverse model for a robot arm during a babbling learning phase in which a robot arm controller causes a set of limbs in the robot arm to make a series of random movements and observes a change in position of the set of limbs corresponding to each of the random movements;

calculate an obstacle avoidance vector for each of the set of limbs in the robot arm to form a plurality of obstacle avoidance vectors, each of the obstacle avoidance vectors incorporating factors including;
- a distance and direction of each of a set of obstacles to the limb; and
- when the limb is part of a kinematic chain of limbs, summing contributions from the obstacle avoidance vectors of all limbs in the kinematic chain; and apply the obstacle avoidance vector to constrain the inverse model in a robot controller, whereby the robot arm can reach a target while avoiding obstacles.

12. The computer program product of claim 11, wherein the obstacle avoidance vector for each limb is determined by the equation:

$$\vec{v}_{limb\ n\ obstacle\ avoidance} =$$

$$f(\vec{v}_{obstacles\ to\ limb\ n}, \vec{v}_{obstacles\ to\ limb\ n+1}, \ldots \vec{v}_{obstacles\ to\ limb\ m}) = \sum_{i=n}^{m} \vec{v}_{obstacles\ to\ limb\ i},$$

where:

$\vec{v}_{limb\ n\ obstacle\ avoidance}$ is the obstacle avoidance vector for limb n;

f(x) is the kinematic chaining function;

$\vec{v}_{obstacles\ to\ limb\ n}$ is a vector representing the distance and direction of all obstacles relative to limb n; and $$\sum_{i=n}^{m} \vec{v}_{obstacles\ to\ limb\ i}$$

is a summation function over all limbs in the kinematic chain.

13. The computer program product of claim 12, wherein the vector $\vec{v}_{obstacle\ to\ limb\ n}$, representing the distance and direction of all obstacles to limb n is determined by the equation:

$$\vec{v}_{obstacles\ to\ limb\ n} =$$

$$\left(\frac{k}{\min\|\vec{v}_{obstacles\ to\ limb\ n}\|}\right) \times \left(\frac{\sum_{i}^{\#obstacles}\left(\frac{1}{\|\vec{v}_{obstacle\ i\ to\ limb\ n}\|}\right)\vec{v}_{obstacle\ i\ to\ limb\ n}}{\left\|\sum_{i}^{\#obstacles}\left(\frac{1}{\|\vec{v}_{obstacle\ i\ to\ limb\ n}\|}\right)\vec{v}_{obstacle\ i\ to\ limb\ n}\right\|}\right),$$

where:

$\vec{v}_{obstacles\ to\ limb\ n}$ is a vector representing the distance and direction of all obstacles to limb n;

k is an operator-defined parameter for controlling the degree of obstacle avoidance desired;

min is a minimum function;

$\vec{v}_{obstacle\ i\ to\ limb\ n}$ is a vector representing the distance and direction of obstacle i to limb n;

$$\sum_{i}^{\#obstacles}$$

is a summation function over all obstacles;

$\|x\|$ is the magnitude of x; and $\min\|\vec{v}_{obstacles\ to\ limb\ n}\|$ is the minimum distance from all obstacles to limb n.

14. The computer program product of claim 13, wherein the obstacle avoidance vector constrains the inverse model in a robot controller according to the equation:

$$\Delta\theta_n = \partial_n \times (\vec{v}_{target} - \vec{v}_{limb\ n\ obstacle\ avoidance}),$$

where:

$\Delta\theta_n$ is the change in joint angle for limb n;

$\partial_n$ is the nth row of the inverse Jacobian matrix learned during babbling;

× is a multiplication function;

$\vec{v}_{target}$ is a target vector representing the direction and distance from the limb to the target; and $\vec{v}_{limb\ n\ obstacle\ avoidance}$ is the obstacle avoidance vector for limb n.

15. The computer program product of claim 11, wherein the obstacle avoidance vector constrains the inverse model in a robot controller according to the equation:

$$\Delta\theta_n = \partial_n \times (\vec{v}_{target} - \vec{v}_{limb\ n\ obstacle\ avoidance}),$$

where:

$\Delta\theta_n$ is the change in joint angle for limb n;

$\partial_n$ is the nth row of the inverse Jacobian matrix learned during babbling;

× is a multiplication function;

$\vec{v}_{target}$ is a target vector representing the direction and distance from the limb to the target; and $\vec{v}_{limb\ n\ obstacle\ avoidance}$ is the obstacle avoidance vector for limb n.

16. An articulated redundant robot arm for use with an adaptive obstacle avoidance system, comprising:

one or more limbs, each limb having at least one joint, each joint having one or more degrees of freedom, where the combined number of degrees of freedom of all joints is greater than or equal to the number of degrees of freedom in the workspace; and a data processing system having one or more processors configured to:

develop an inverse model for a robot arm during a babbling learning phase in which a robot arm controller causes a set of limbs in the robot arm to make a series of random movements and observes a change in position of the set of limbs corresponding to each of the random movements;

calculate an obstacle avoidance vector for each of the set of limbs in the robot arm to form a plurality of obstacle avoidance vectors, each of the obstacle avoidance vectors incorporating factors including;

a distance and direction of each of a set of obstacles to the limb; and when the limb is part of a kinematic chain of limbs, summing contributions from the obstacle avoidance vectors of all limbs in the kinematic chain; and apply the obstacle avoidance vector to constrain the inverse model in a robot controller, whereby the robot arm can reach a target while avoiding obstacles.

17. The articulated redundant robot arm of claim 16, wherein the obstacle avoidance vector for each limb is determined by the equation:

$$\vec{v}_{limb\ n\ obstacle\ avoidance} =$$

$$f(\vec{v}_{obstacles\ to\ limb\ n}, \vec{v}_{obstacles\ to\ limb\ n+1}, \ldots \vec{v}_{obstacles\ to\ limb\ m}) = \sum_{i=n}^{m} \vec{v}_{obstacles\ to\ limb\ i},$$

where:

$\vec{v}_{limb\ n\ obstacle\ avoidance}$ is the obstacle avoidance vector for limb n;

f(x) is the kinematic chaining function;

$\vec{v}_{obstacles\ to\ limb\ n}$ is a vector representing the distance and direction of all obstacles relative to limb n; and $$\sum_{i=n}^{m} \vec{v}_{obstacles\ to\ limb\ i}$$

is a summation function over all limbs in the kinematic chain.

18. The articulated redundant robot arm of claim 17, wherein the vector $\vec{v}_{obstacles\ to\ limb\ n}$, representing the distance and direction of all obstacles to limb n is determined by the equation:

$$\vec{v}_{obstacles\ to\ limb\ n} = \left(\frac{k}{\min\|\vec{v}_{obstacles\ to\ limb\ n}\|}\right) \times \left(\frac{\sum_{i}^{\#obstacles}\left(\frac{1}{\|\vec{v}_{obstacle\ i\ to\ limb\ n}\|}\right)\vec{v}_{obstacle\ i\ to\ limb\ n}}{\left\|\sum_{i}^{\#obstacles}\left(\frac{1}{\|\vec{v}_{obstacle\ i\ to\ limb\ n}\|}\right)\vec{v}_{obstacle\ i\ to\ limb\ n}\right\|}\right),$$

where:

$\vec{v}_{obstacles\ to\ limb\ n}$ is a vector representing the distance and direction of all obstacles to limb n;

k is an operator-defined parameter for controlling the degree of obstacle avoidance desired;

min is a minimum function;

$\vec{v}_{obstacle\ i\ to\ limb\ n}$ is a vector representing the distance and direction of obstacle i to limb n;

$$\sum_{i}^{\#obstacles}$$

is a summation function over all obstacles;

$\|x\|$ is the magnitude of x; and $\min\|\vec{v}_{obstacles\ to\ limb\ n}\|$ is the minimum distance from all obstacles to limb n.

19. The articulated redundant robot arm of claim 18, wherein the obstacle avoidance vector constrains the inverse model in a robot controller according to the equation:

$$\Delta\theta_n = \partial_n \times (\vec{v}_{target} - \vec{v}_{limb\ n\ obstacle\ avoidance}),$$

where:

$\Delta\theta_n$ is the change in joint angle for limb n;

$\partial_n$ is the nth row of the inverse Jacobian matrix learned during babbling;

× is a multiplication function;

$\vec{v}_{target}$ is a target vector representing the direction and distance from the limb to the target; and $\vec{v}_{limb\ n\ obstacle\ avoidance}$ is the obstacle avoidance vector for limb n.

20. The articulated redundant robot arm of claim 16, wherein the obstacle avoidance vector constrains the inverse model in a robot controller according to the equation:

$$\Delta\theta_n = \partial_n \times (\vec{v}_{target} - \vec{v}_{limb\ n\ obstacle\ avoidance}),$$

where:

$\Delta\theta_n$ is the change in joint angle for limb n;

$\partial_n$ is the nth row of the inverse Jacobian matrix learned during babbling;

× is a multiplication function;

$\vec{v}_{target}$ is a target vector representing the direction and distance from the limb to the target; and $\vec{v}_{limb\ n\ obstacle\ avoidance}$ is the obstacle avoidance vector for limb n.

\* \* \* \* \*